United States Patent [19]

Roberts

[11] Patent Number: 4,615,139
[45] Date of Patent: Oct. 7, 1986

[54] PROCESS FOR APPLYING LIQUID CHEMICAL DRYING AGENTS TO HAY USING A 3-BAR ASSEMBLY

[75] Inventor: Jeffrey S. Roberts, Hudson, Wis.

[73] Assignee: Harvest Tec, Inc., Hudson, Wis.

[21] Appl. No.: 709,700

[22] Filed: Mar. 8, 1985

[51] Int. Cl.$^4$ ............................................. A01M 21/00
[52] U.S. Cl. ........................................................ 47/1.7
[58] Field of Search .................................... 47/1.5, 1.7

[56] References Cited

U.S. PATENT DOCUMENTS

| | | | |
|---|---|---|---|
| 715,929 | 12/1902 | Zedlitz | 47/1.7 |
| 809,046 | 1/1906 | Collins | 47/1.7 |
| 1,733,883 | 10/1929 | Jaecks | 47/1.7 |
| 3,016,653 | 1/1962 | Gardner | 47/1.7 |
| 3,959,924 | 6/1976 | Allen | 47/1.7 X |
| 3,986,298 | 10/1976 | Ablett et al. | 47/1.7 |

Primary Examiner—Robert E. Bagwill

[57] ABSTRACT

The process of this invention uses 2 bars to tip alfalfa or clover hay forward while a third bar holds spray devices that deliver liquid chemical drying agents to the crop in such a way that most of the chemical is applied to the plant's stems and very little is applied to the plant's leaves. Effectiveness of the liquid chemical drying agents is maximized in this way.

3 Claims, 8 Drawing Figures

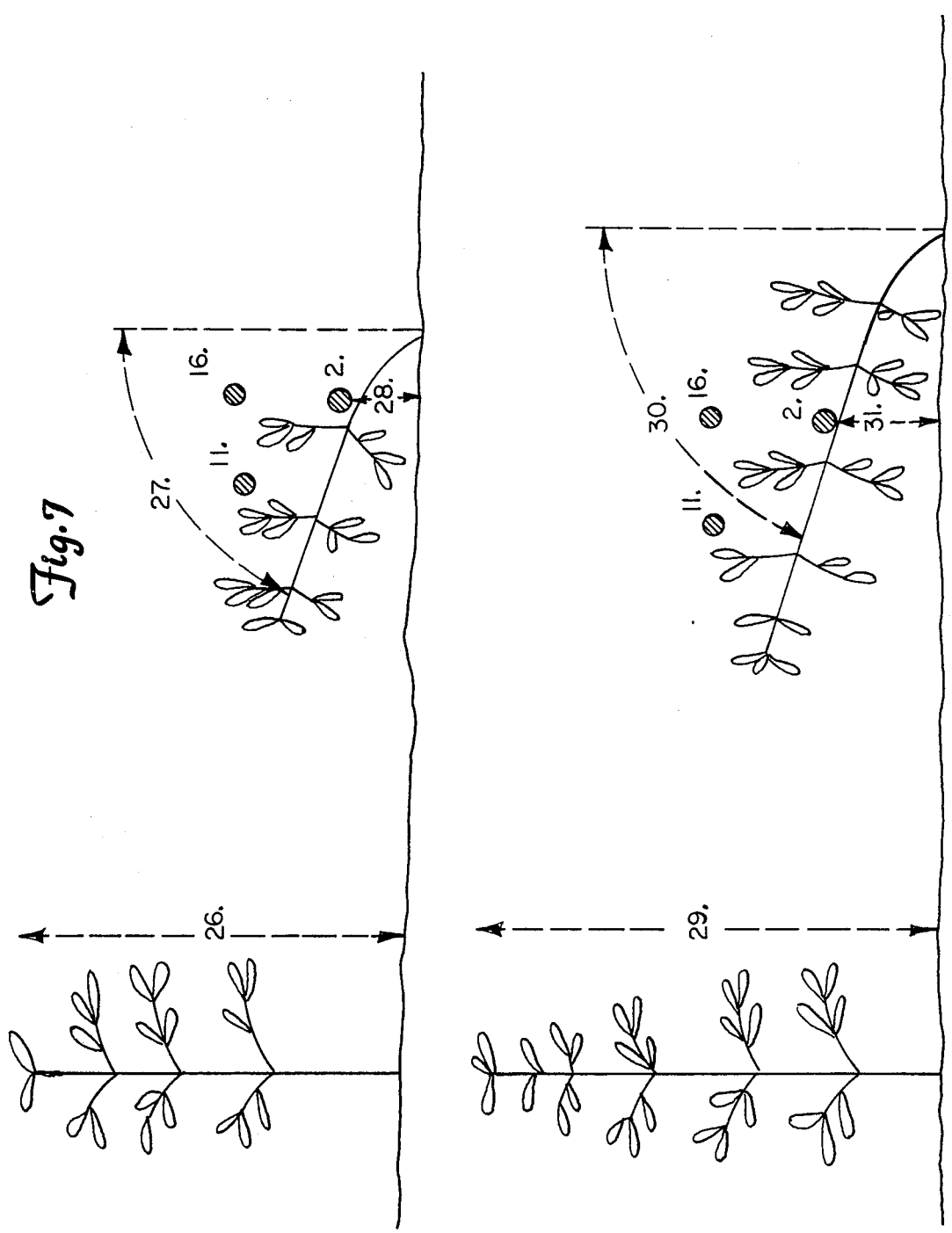

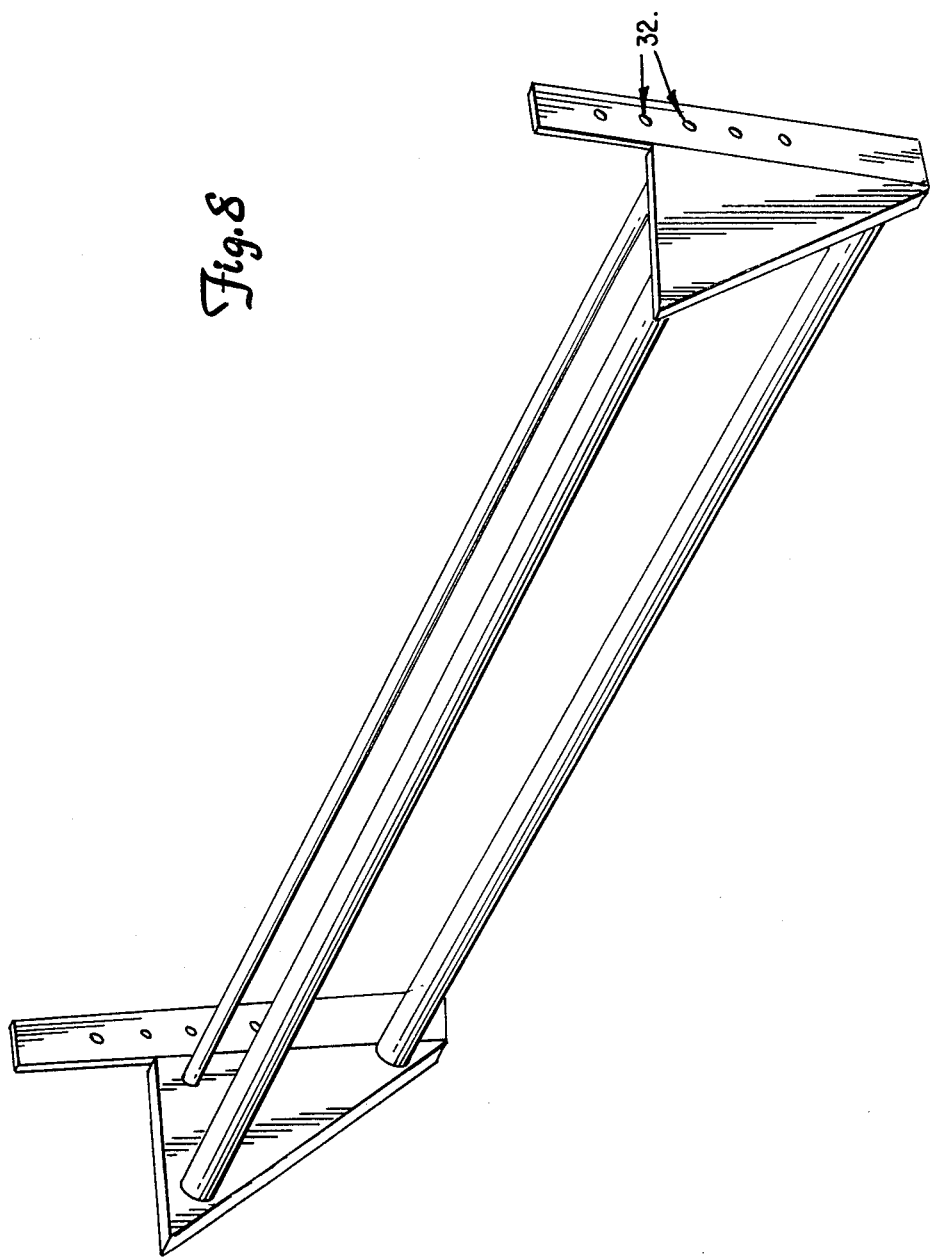

PROCESS FOR APPLYING LIQUID CHEMICAL DRYING AGENTS TO HAY USING A 3-BAR ASSEMBLY

SUMMARY OF THE INVENTION

The recent development of using chemicals to speed the drying of alfalfa or clover hay has given rise to an improved process of applying these chemicals. The embodiment of this process employs a 3-bar assembly which, when set at a specific height, bends the standing plant forward at an optimum angle while spraying the drying agent in a specific and contained area. The invention maximizes the effectiveness of drying agents on alfalfa or clover hay by directing the spray at the stems of the plant, and by keeping the spray off the leaves of the plant.

LISTING OF THE DRAWINGS

FIG. 1: Orientation of the plant's leaves and stem when it is upright

FIG. 2: Cross section of the plant's leaves and stem when it is bent forward 60 degrees from vertical FIG. 3: Cross section of the plant's leaves and stem when it is bent forward 75 degrees from vertical FIG. 4: Flow chart of cross sections showing why 2 push bars are required to bend the plant forward 75 degrees from vertical FIG. 5: Dimensions of a typical 3-bar assembly FIG. 6: Cross section diagram illustrating the area covered by the desired spray pattern FIG. 7: Cross section shown variance in optimum height of push bars as plant height changes FIG. 8: A typical 3-bar assembly with adjustable height feature

DETAILED DESCRIPTION OF THE INVENTION

Figure 1:
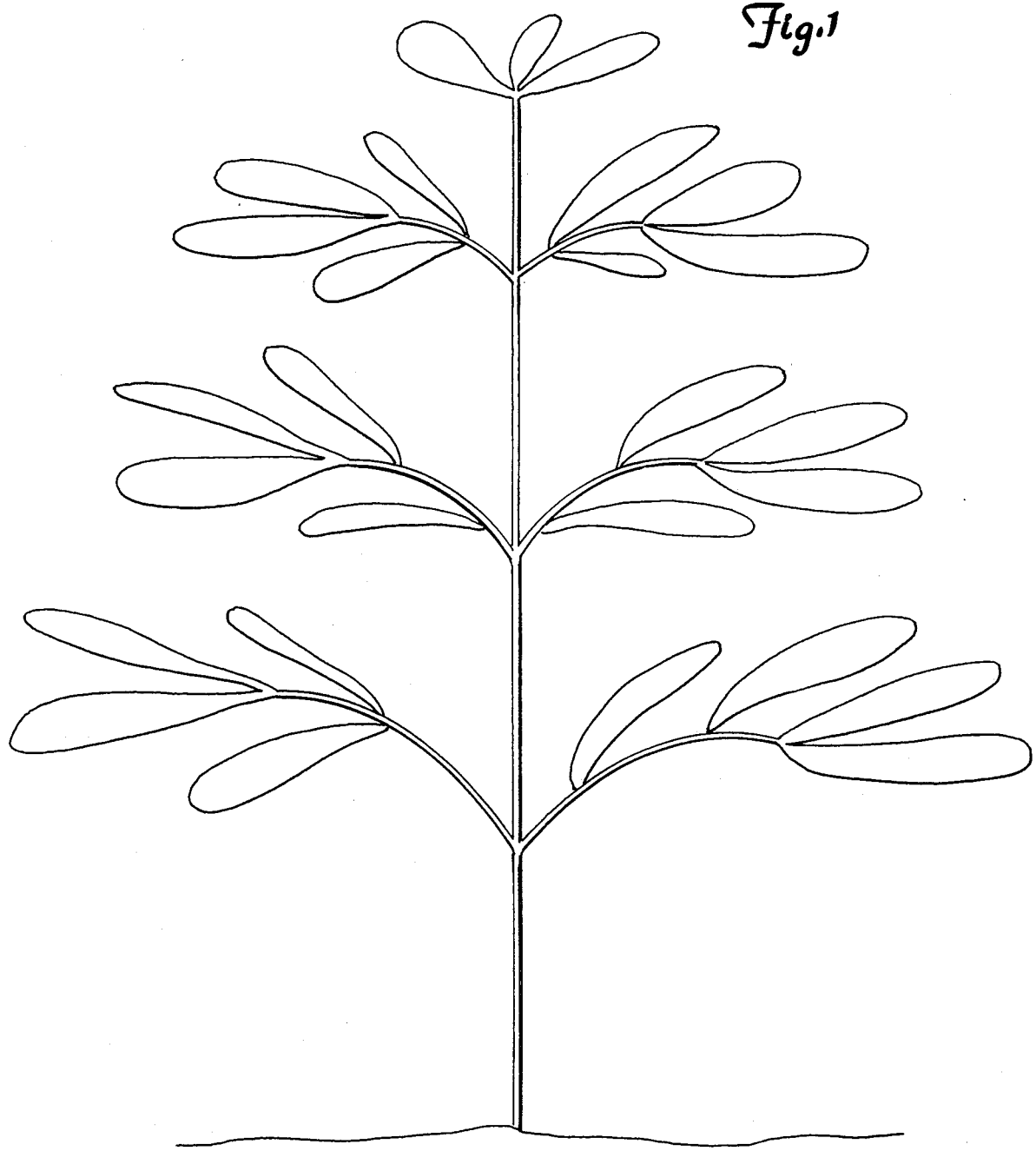
Figure 2:
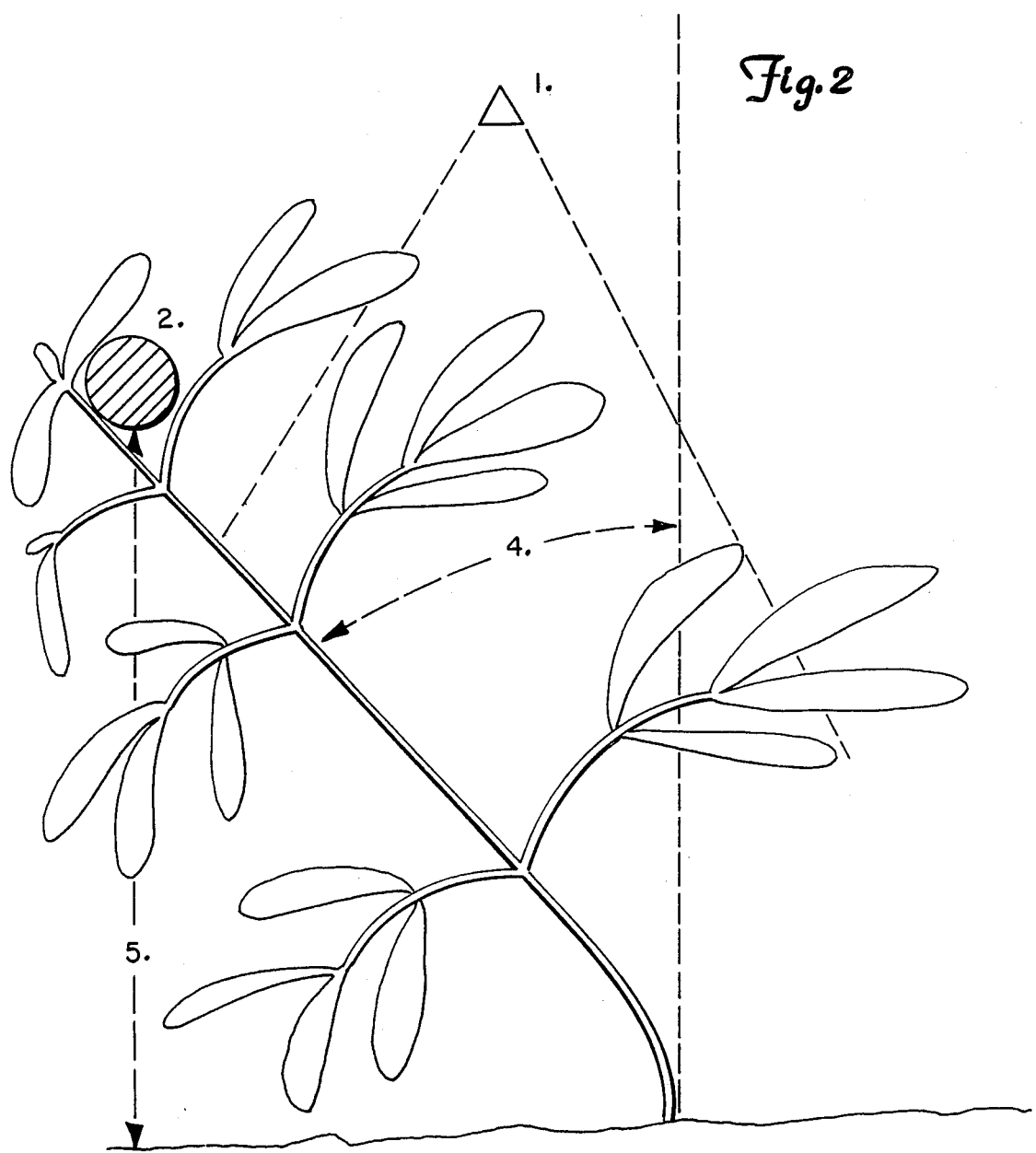

In 1980 U.S. Researchers first reported on the use of chemicals to speed the drying process of alfalfa hay (Rotz and Thomas; *Journal of Animal Science*). They reported spraying these chemicals on the hay after it was cut by aiming spraying devices to cover the hay as it passed thru the hay-cutting implement. Later Rotz ad Ehle reported some advantage to applying these chemicals just ahead of the cutting implement by mounting the spraying devices on the front of the hay-cutting implement (*Hoard's Dairyman*, Mar. 23, 1984). In this procedure a bar was mounted ahead of the implement and 12 inches from the ground. This bar pushed the hay forward about 60 degrees from vertical as it travelled thru the hay. The advantage of using this procedure is illustrated in FIGS. 1 and 2. The spray pattern of chemical normally originates above the plant. With this pattern, most of the sprayed material will fall on the leaves of the plant and very little will fall on the stems of the plant. After the plant is cut it lies in the field while moisture is naturally removed from the plant cells. Moisture in the stem of the plant remains longer than moisture in the leaves (Friesen and Von Bargen, 1978). Applying a chemical to speed the drying process mostly on the leaves when the plant is upright, as in the example illustrated in FIG. 1, will further increase the moisture differential between the leaves and the stems. This becomes a disadvantage later when harvesting occurs. The hay cannot be harvested while the stems are too wet even though the chemical has decreased the moisture in the leaves. When the stem moisture does reach a point low enough for harvest, the leaf moisture is normally so low that this part of the plant will shatter during the handling associated with harvest. This leaf shattering contributes to a reduced harvest value of alfalfa and clover.

The push bar that Rotz and Ehle used is illustrated in FIG. 2, Ref. 2. The bar was designed to push the alfalfa or clover plant forward, exposing the stem, so that the spray pattern could hit the stems, as illustrated in the example FIG. 2, Ref. 1. This example shows the bar, located about 12" above the ground as measured in Ref. 3 on a normal plant 24 inches high, would be bent to a maximum angle of 60 degrees from vertical as measured in FIG. 2, Ref. 4. In this example, some of the material hits the leaves which are still in the way, and some hits the stems which are somewhat exposed.

Figure 3:
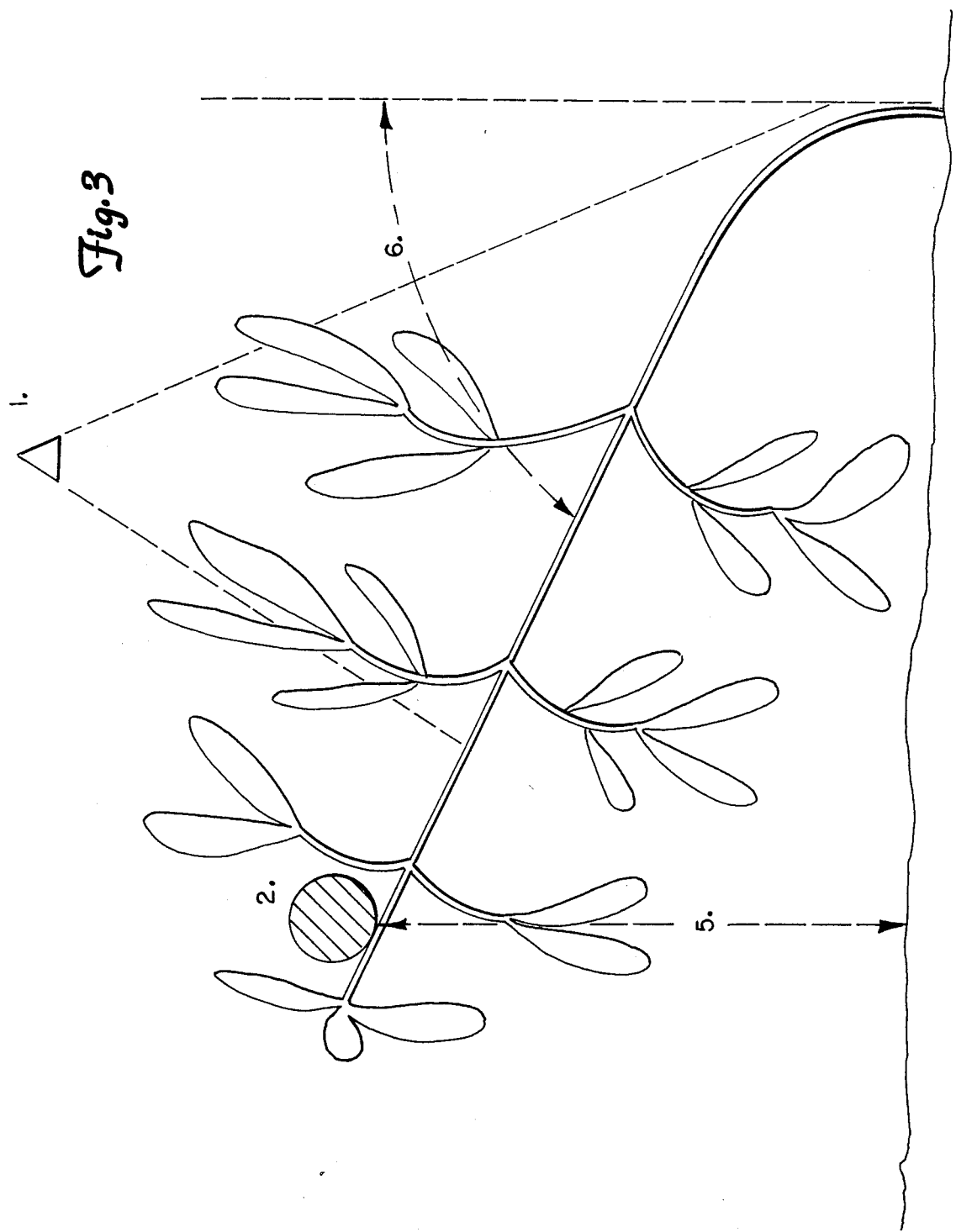

The process can be improved by lowering the bar so that it tips the alfalfa or clover plant forward at a greater angle and exposes more of the stem. The example in FIG. 3 shows a bar, Ref. 2, pushing the alfalfa plant forward. The bar in this example is located 7 inches above the ground (Ref. 5) tipping a 24 inch alfalfa plant to a maximum angle of 75 degrees from vertical (Ref. 6). By tipping the plant to this maximum angle the leaves are perpendicular to the spray pattern coming from above (Ref. 1). The amount of spray hitting the leaves is minimized and the amount hitting the stems is maximized.

The benefit of maximizing the spray coverage to the stems by lowering the bar was seen when hay was cut and sprayed with a 2.7% solution of Potassium Carbonate. Moisture content was monitored every hour. A nine foot haybine was fitted with an adjustable height push bar 15 inches in front of the cutting knives. A uniform field of alfalfa was cut with one windrow each with the following bar configurations: 1. bar removed; 2. bar set 12 inches from the ground; 3. bar set 7 inches from the ground. Each windrow was approximately 80 yards long and the last of the 3 rows was cut within 20 minutes of when the first was cut. Moisture readings were taken of windrow samples, beginning at 42 hours after cutting. The sample was determined to be ready for harvest when moisture content reached 18 percent moisture as determined by a Dickey-John Electronic Forage Moisture Tester.

| PUSH BAR CONFIGURATION | HOURS AFTER CUTTING THAT HAY WAS READY FOR HARVEST |
| --- | --- |
| No push bar | 69 hours |
| Push bar 12 inches from ground | 61 hours |
| Push bar 7 inches from ground | 46 hours |

The lower setting for the push bar applies more of the drying chemical to the stem and less to the leaves and therefore the alfalfa is ready for harvest sooner. This provides a user with an advantage in that there will be less chance the hay will be rained on before it is harvested.

Figure 4:
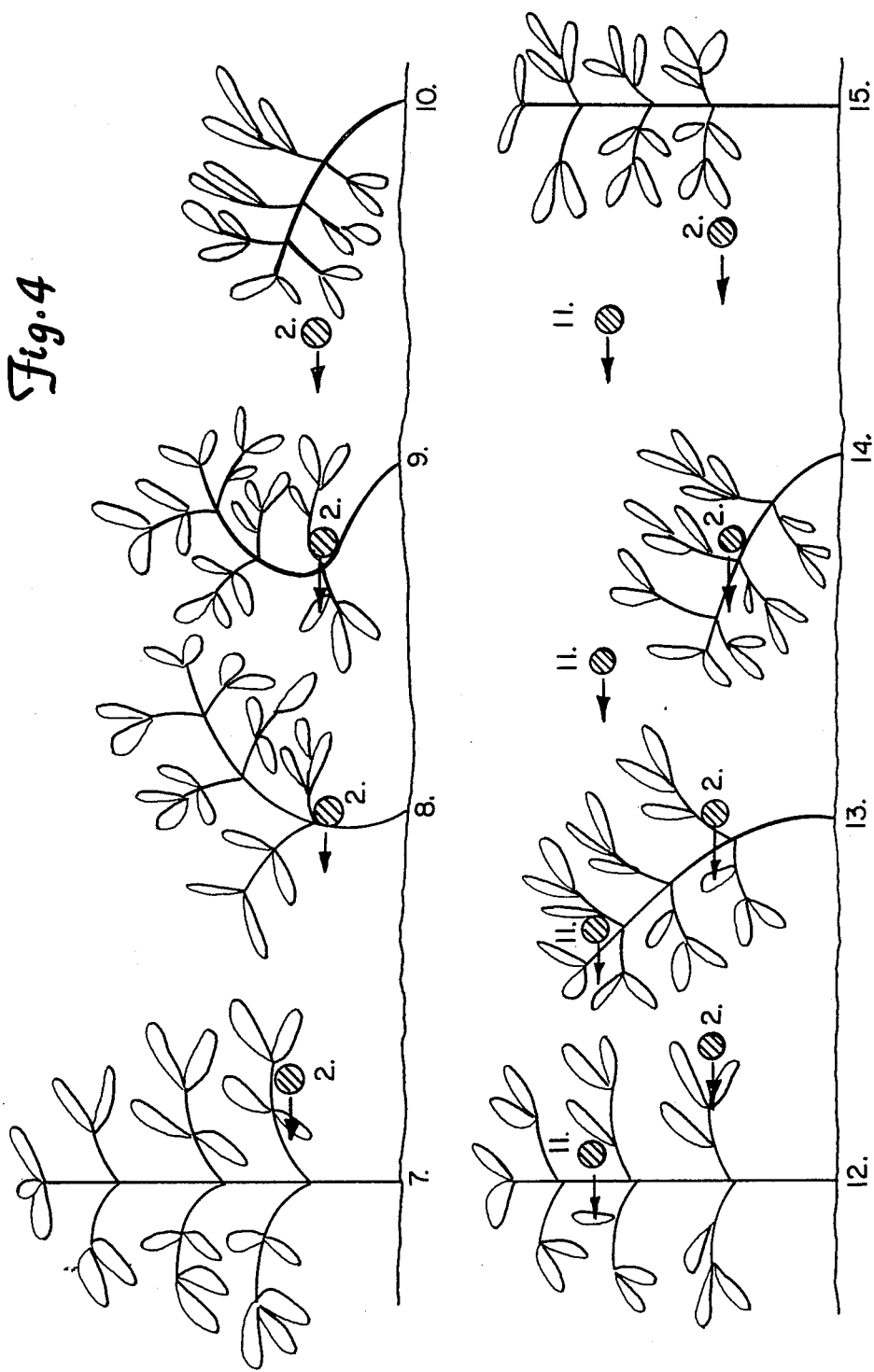

The embodiment of the process of this invention is to apply a chemical drying agent to alfalfa or clover hay using a 3-bar assembly with the lowest bar pushing the hay forward to a maximum angle of between 65 degrees and 80 degrees from vertical. When the bar is located this close to the ground, hay will wrap back around the bar as illustrated in FIG. 4, Ref. 7 thru Ref. 10. After the bar passes, the hay that has been wrapped does not spring back upright and is difficult to cut. By adding an additional push bar, higher and forward of the main push bar, the wrapping problem is eliminated as seen in FIG. 4, Ref. 12 thru Ref. 15. The higher push bar tips the hay forward to an angle between 40 degrees and 60 degrees from vertical. While the hay is still in contact with the higher push bar, the lower bar hits the hay and bends it to the optimum angle between 65 degrees and 80 degrees from vertical. The hay will not wrap on either bar if they are oriented properly.

Figure 5:
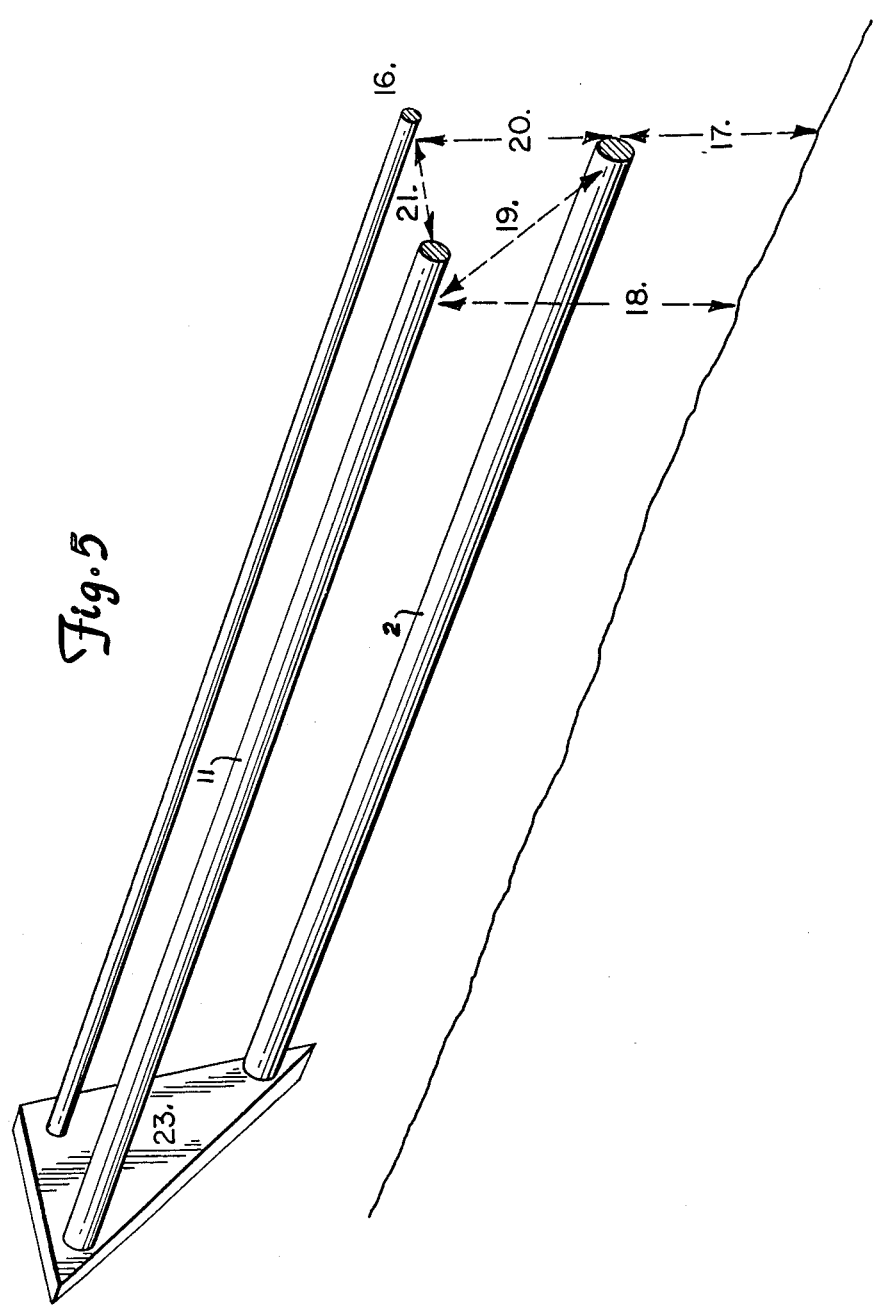

FIG. 5 shows a typical three-bar assembly. The two push bars, Ref. 2 and Ref. 11 are oriented so that the optimum angle can be obtained, tipping the hay forward between 65 degrees and 80 degrees from vertical. Spray devices would be attached to the third bar, Ref. 16, so that the spray would hit the hay just behind the lower bar where it is tipped forward at the optimum angle. The dimensions to accomplish this are specified as follows:

FIG. 5, Ref. 17: 4" to 9"
FIG. 5, Ref. 18: 10" to 20"
FIG. 5, Ref. 19: 6" to 12"
FIG. 5, Ref 20: 8" to 18"
FIG. 5, Ref. 21: 5" to 7"

This 3-bar assembly would normally be constructed of tubular steel, square or round, or steel pipe, FIG. 5, Ref. 2, Ref. 11, and Ref. 16. The 3 bars would be held in place with end plates, Ref. 23, that would fix their relationship according to the specific dimensions above. The 3-bar assembly is best used when attached to the front of the hay-cutting implement, but it can also be attached to a tractor that pulls the hay-cutting implement. In either case, its width would be the same as the cutting width of the implement, normally between 7 and 16 feet. Its construction must be heavy enough to eliminate any bending of the bars in the center so that the specified dimensions do not change.

Figure 6:
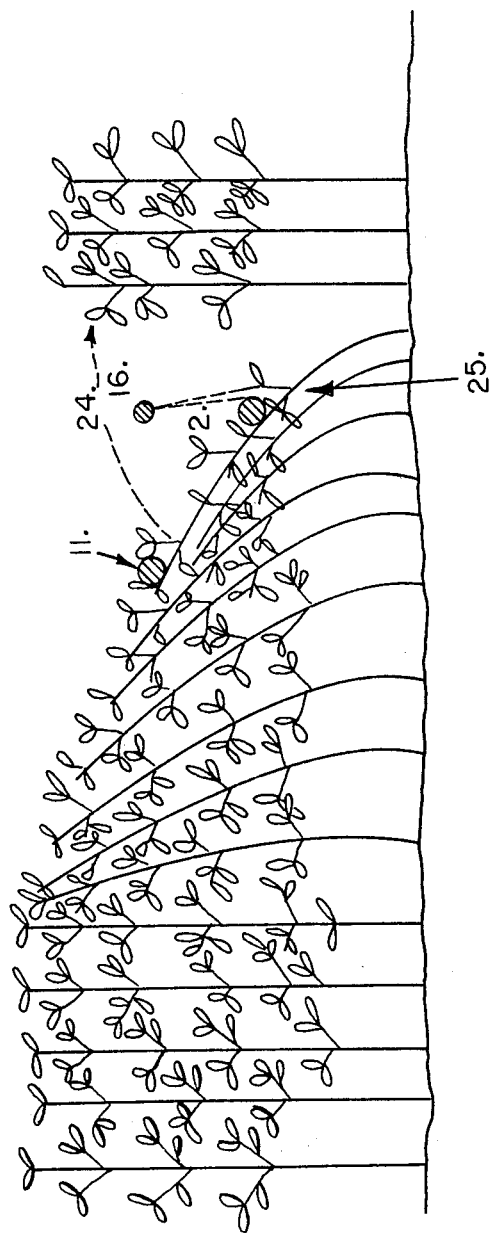

The embodiment of the process of this invention may be further improved by using a spray pattern which directs the chemical into a specific area. A cross-section of a 3-bar assembly travelling thru a field of alfalfa or clover hay is seen in FIG. 6. The 2 push bars (Ref. 2 and Ref. 11) are tipping the hay forward to an optimum angle, between 65 degrees and 80 degrees forward of vertical. The hay is bent at this angle between the lower bar (Ref. 2) and the ground. When the top of the plant is passed by the lower bar, it travels back to the vertical position along the path indicated by Ref. 2 in FIG. 6. As it travels back, its leaves will again obstruct the spray from hitting the stems. By aiming the spray directly behind the lower bar, it hits the plant when it is bent at the optimum angle, and the obstruction from leaves as plants travel back to vertical is minimized. Directing the spray to this location (FIG. 6, Ref. 25) is accomplished by mounting the spraying devices on the spray bar, FIG. 6, Ref. 16, and using a spraying device that delivers a flat fan. These devices are normally mounted on the bar with a spacing so that the spray from each device overlaps the next by 10% or more. Normally, the spraying devices used would consist of controlled size and shape orifices to which the liquid chemical is pumped at a regulated pressure. Delivery of the chemical to this specific area can be further maximized by employing a low pressure delivery system. The chemical delivered in the low pressure range, typically between 10 and 40 PSI, will be more consistently applied to the area in which the spraying devices are aimed. Deflection and drift will be minimized using this low pressure spraying system as part of the process.

The process of this invention may include a height adjustment on the 3-bar assembly. This feature will allow for adjustments to be made for different heights of alfalfa or clover hay without changing the relationship of the 3 bars to each other. These plants, at the proper maturity for harvest, can normally range from 18 inches to 32 inches in height. To maintain an optimum angle of bend, the lower bar needs to be adjusted to compensate for variation in the height of the crop being cut. FIG. 7 illustrates the principle this part of the process may use. In this example, the alfalfa plant in Ref. 26 is 18 inches. To bend the plant to an optimum angle of 70 degrees forward of vertical (Ref. 27) the lower bar (Ref. 2) is 6 inches above the ground (Ref. 28). This makes the upper bar (Ref. 11) 10 to 15 inches above the ground and the spray bar (Ref. 16) 14 to 24 inches above the ground.

In the example in FIG. 7, Ref. 29, the alfalfa is 32 inches high. To maintain the same optimum angle of bend, 70 degrees forward of vertical (Ref. 30), the lower bar (Ref. 2) is 10 inches above the ground. The height of the entire assembly, in this example, should be raised 4 inches from the height in the previous example, so that the relationship between the 3 bars does not change when the lower bar is raised to maintain the optimum angle of bend. This may be accomplished by utilizing a configuration for the 3 bar assembly that fixes the bars together with end plates and allows for adjustment up and down of those end plates, such as the example in FIG. 8. Adjusting holes on the end plates may be spaced 1 inch apart, or they may be slotted holes to allow for raising and lowering of the entire assembly so that the lower bar can be set a minimum of 5 inches from the ground to a maximum of 12 inches from the ground. This adjustment will allow for maintaining the optimum angle of bend as the process of this invention is employed in different heights of hay crops.

What is claimed is:

1. A process for applying liquid chemical drying agents to alfalfa or clover plants using a 3-bar assembly that moves thru the plants in such a manner that the first bar pushes the plants forward between 40 degrees and 60 degrees from vertical, the second bar pushes the plants forward between 65 degrees and 80 degrees from vertical, and the third bar holds spraying devices that deliver the liquid to the plants just after such plants pass under the second bar.

2. A process as in claim 1 where the spraying devices deliver the liquid to the the plants in a flat fan pattern under low pressure, 10 to 40 PSI.

3. A process as in claim 1 where the bars in the 3-bar assembly are fixed together so that distances between them cannot change and where the entire assembly can be raised and lowered so that the lowest bar will bend the plants forward between 65 degrees and 80 degrees from vertical no matter how tall the plants are.

* * * * *